(12) United States Patent  
Moffett

(10) Patent No.: US 9,342,145 B2
(45) Date of Patent: May 17, 2016

(54) CURSOR CONTROL

(71) Applicants: KABUSHIKI KAISHA TOSHIBA, Tokyo (JP); Toshiba Medical Systems Corporation, Otawara-shi (JP)

(72) Inventor: Richard Moffett, Edinburgh (GB)

(73) Assignees: KABUSHIKI KAISHA TOSHIBA, Tokyo (JP); TOSHIBA MEDICAL SYSTEMS CORPORATION, Otawara-shi (JP)

(*) Notice: Subject to any disclaimer, the term of this patent is extended or adjusted under 35 U.S.C. 154(b) by 456 days.

(21) Appl. No.: 13/746,679

(22) Filed: Jan. 22, 2013

(65) Prior Publication Data

US 2014/0208273 A1     Jul. 24, 2014

(51) Int. Cl.
    *G06F 3/048*     (2013.01)
    *G06F 3/01*     (2006.01)
    *G06F 3/033*     (2013.01)
    *G06F 3/0484*     (2013.01)

(52) U.S. Cl.
    CPC ............... *G06F 3/013* (2013.01); *G06F 3/033* (2013.01); *G06F 3/0484* (2013.01)

(58) Field of Classification Search
    CPC .... G06F 3/0481; G06F 3/04812; G06F 3/013
    USPC ......................................................... 715/856
    See application file for complete search history.

(56) References Cited

U.S. PATENT DOCUMENTS

| | | | |
|---|---|---|---|
| 6,847,336 B1 | 1/2005 | Lemelson et al. | |
| 7,503,653 B2 | 3/2009 | Endrikhovski et al. | |
| 2003/0112328 A1* | 6/2003 | Yoon | G03B 35/20 348/51 |
| 2008/0062382 A1* | 3/2008 | Endrikhovski | G06F 3/038 351/209 |
| 2009/0125849 A1* | 5/2009 | Bouvin | G06F 3/013 715/863 |
| 2010/0023857 A1* | 1/2010 | Mahesh | G06F 3/016 715/701 |
| 2011/0170066 A1* | 7/2011 | Sugio | A61B 5/7207 351/209 |
| 2012/0105324 A1* | 5/2012 | Lee | G06F 3/005 345/157 |
| 2012/0176543 A1* | 7/2012 | Jeong | G06F 3/04883 348/563 |
| 2013/0145304 A1* | 6/2013 | DeLuca | G06F 3/013 715/781 |

(Continued)

FOREIGN PATENT DOCUMENTS

| | | |
|---|---|---|
| JP | 5-161608 | 6/1993 |
| JP | 2006-4093 | 1/2006 |
| JP | 2009-223494 | 10/2009 |

OTHER PUBLICATIONS

Iuca del Tongo, "Emgu CV (openCV wrapper) Cursor Position Face Control", YouTube, http://www.youtube.com/watch?v=6FxUe8KWNa4, Jul. 14, 2009, 1 page.

*Primary Examiner* — Anil Bhargava
(74) *Attorney, Agent, or Firm* — Oblon, McClelland, Maier & Neustadt, L.L.P.

(57) ABSTRACT

Certain embodiments provide a computer system for controlling the movement of a displayed cursor, the computer system comprising: a first display region; a second display region; a user input unit configured to measure movements made by a user in association with the user input unit and to output corresponding movement signaling; a vision tracking unit configured to determine a direction in which a user is looking and to output corresponding view-direction signaling; and a cursor control unit arranged to select one of the first display region and the second display region as a selected display region based on the view-direction signaling associated with the vision tracking unit and to control a cursor to move within the selected display region based on the movement signaling associated with the user input unit.

16 Claims, 8 Drawing Sheets

(56) References Cited

U.S. PATENT DOCUMENTS

2013/0169532 A1* 7/2013 Jahnke ............... G06F 3/013
                                                    345/158

2013/0265227 A1* 10/2013 Julian ............... G06F 3/04812
                                                     345/157

* cited by examiner

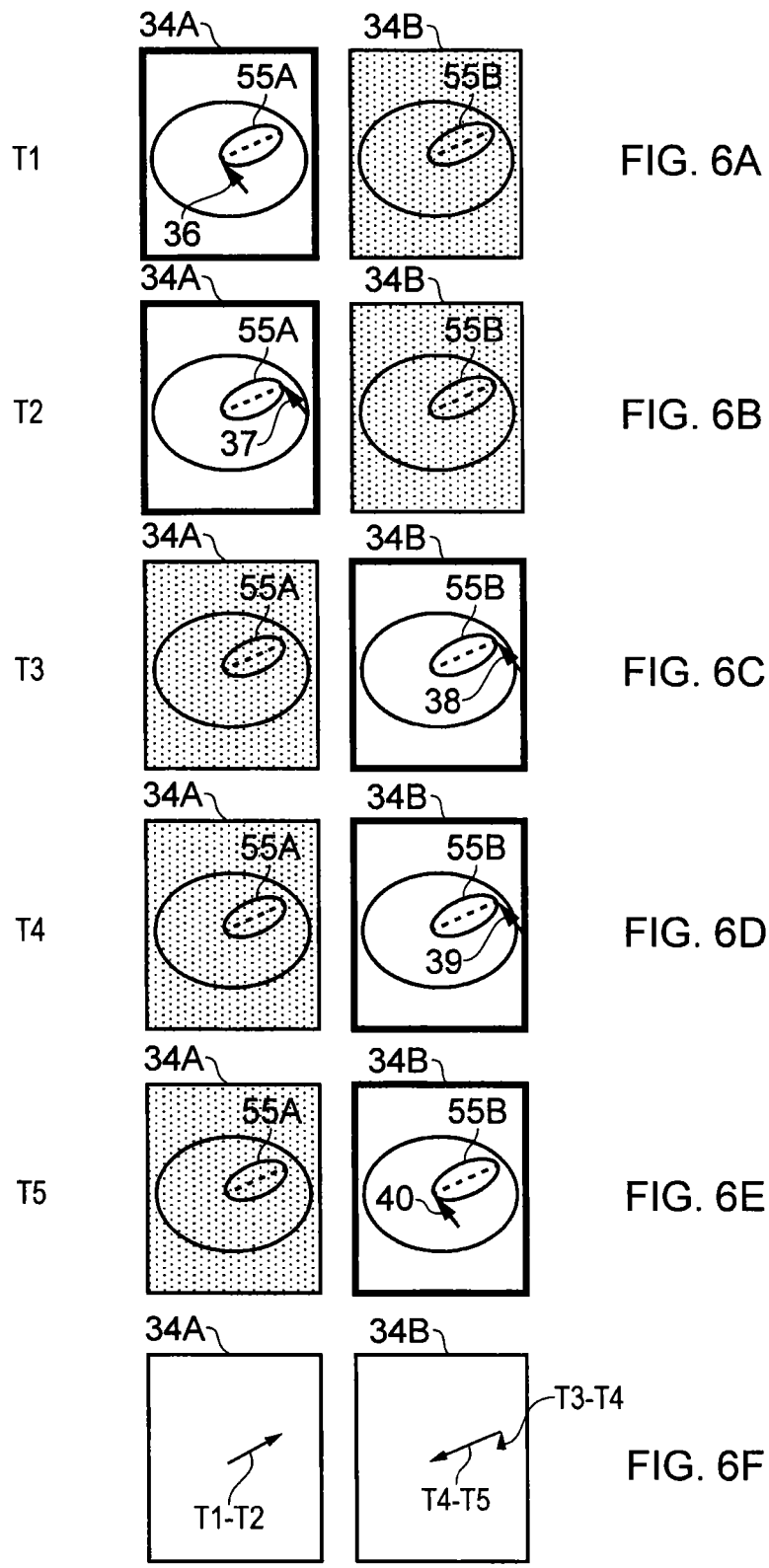

CURSOR CONTROL

BACKGROUND OF THE INVENTION

Embodiments described herein generally relate to schemes for cursor control, and in particular to controlling a cursor in a computer system comprising more than one display region, for example a computer system for displaying different images derived from medical image data on different display screens.

A well-known aspect of user interfaces commonly associated with computer systems is the provision of pointing devices for controlling a cursor/pointer on a display. Typically a pointing device will be a physical input device, such as a mouse, track pad, joystick or stylus-based digitizer, which responds to movements by a user to cause a cursor displayed on a display to move in a corresponding manner, thereby allowing a user to intuitively move the cursor around the display, for example to indicate selections relating to what is displayed on the screen by "pointing" and "clicking".

One field in which computer systems are frequently used to view image data is in the medical imaging field. For example, a user may wish to view images derived from studying a patient with an imaging modality such as X-ray, computer-assisted tomography (CT), magnetic resonance (MR), ultrasound and positron-emission-tomography (PET) data sets. In particular a user may wish to view displays of medical image data to analyze various aspects of the data, for example by taking measurements therefrom. Measurements may be obtained, for example, from locations in displayed images which are selected by a user moving a display cursor to identify elements of displayed images that are of interest.

It is common for users to review medical image data using a computer system comprising more than one display screen. For example, a first display screen may be used to display a first medical image (or images) and a second display screen may be used to display a second medical image (or images). Providing for multiple displays in this way can help a user readily compare different images on different displays. For example, a user may often wish to compare images from studies of a patient from different times, or to compare images from a patient with a corresponding reference image.

In circumstances where a computer system provides a single pointing device to allows a user to interact with multiple display regions the cursor will typically be moved from one screen to the other by a user controlling movement of the cursor so the cursor in effect leaves one display region through one of its edges and enters the other display region through a corresponding position on one of its edges. Conveniently, the entry and exit edges of the respective display screens will be physically adjacent to provide a user with the impression of there being a single continuous movement of the cursor in moving from one display screen to the other.

The inventor has recognized a drawback with this approach is a potential need for a user to undertake repeated large-scale movements, which might be termed "long moves", in order to move a display cursor (pointer) between regions of interest in images represented on different displays or user interface elements in a medical imaging application that are only presented in one of a plurality of displays. Not only can this become tedious and time-consuming for the user, it can increase the probability of repetitive-strain types of injury.

Previous proposals for helping the process of cursor control in computer systems have involved schemes in which a cursor is moved in response to eye or head movements of a user using vision tracking techniques. However, in some situations, in particular in medical imaging applications, there can be a requirement to maintain precise cursor control in conjunction with the ability to make large cursor movements, for example to move between different displays, and this is not generally possible with current vision tracking techniques.

With this in mind there is a desire to provide improved schemes for controlling cursors in computer systems employing multiple display regions, for example in the field of medical imaging.

BRIEF DESCRIPTION OF THE DRAWINGS

Embodiments of the invention are now described by way of example only with reference to the following drawings.

FIGS. 6A to 6F schematically represent how a user may control a cursor to take measurements from medical image data represented on two displays in accordance with an embodiment of the invention.

DETAILED DESCRIPTION

Figure 1:
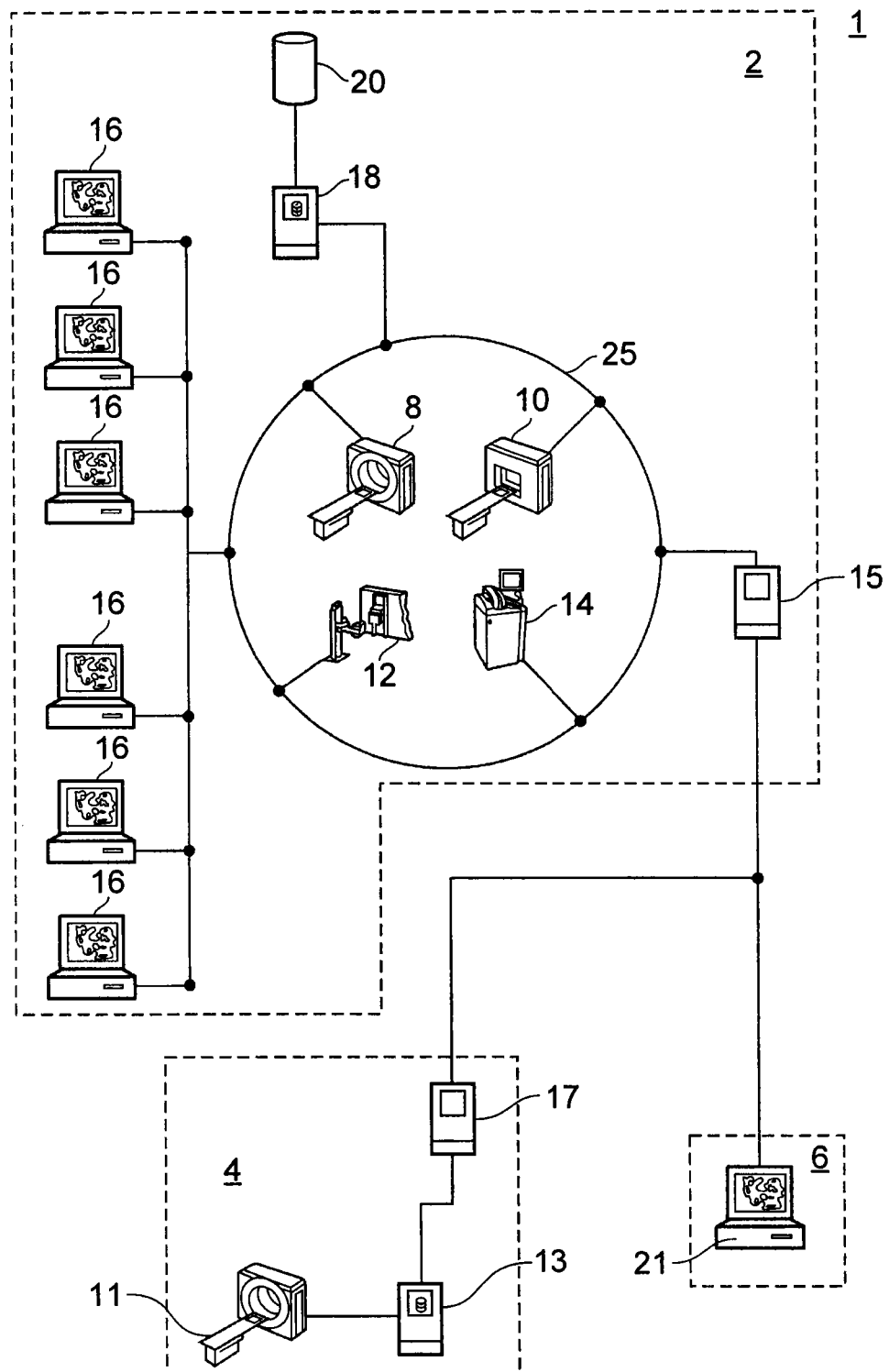
FIG. 1 is a schematic diagram showing an exemplary network of diagnostic devices and associated equipment.

Certain embodiments of the invention provide a computer system for controlling the movement of a displayed cursor, the computer system comprising: a first display region; a second display region; a user input unit configured to measure movements made by a user in association with the user input unit and to output corresponding movement signaling; a vision tracking unit configured to determine a direction in which a user is looking and to output corresponding view-direction signaling; and a cursor control unit arranged to select one of the first display region and the second display region as a selected display region based on the view-direction signaling associated with the vision tracking unit and to control a cursor to move within the selected display region based on the movement signaling associated with the user input unit.

In accordance with certain embodiments the first and second display regions comprise different display screens.

In accordance with certain embodiments the first and second display regions comprise different areas of a single display screen.

In accordance with certain embodiments the first and second display regions are configured to display medical image related data, In accordance with certain embodiments the cursor control unit is configured to change the selection of the first or second display regions as the selected display region in response to a change in view-direction signaling indicating the user's view direction has changed from looking at one of the first and second display regions to looking at the other of the first and second display regions.

In accordance with certain embodiments the cursor control unit is configured to receive signaling to indicate the cursor control unit should avoid changing the selection of the first or second display regions as the selected display region in response to a change in view-direction signaling in respect to a particular change in view-direction signaling.

In accordance with certain embodiments the cursor control unit is configured such that following a change to a newly-selected display region from a previously-selected display region an initial cursor position in the newly-selected display region is determined by taking account of a cursor position in the previously-selected display region before the change.

In accordance with certain embodiments the initial cursor position in the newly-selected display region and the cursor position in the previously-selected display region before the change are at corresponding positions relative to coordinate systems for their respective display regions.

In accordance with certain embodiments the initial cursor position in the newly-selected display region and the cursor position in the previously-selected display region before the change are at corresponding positions relative to one or more features displayed in both the first and second display regions.

In accordance with certain embodiments the cursor control unit is configured such that following a change to a newly-selected display region from a previously-selected display region an initial cursor position in the newly-selected display region is determined by taking account of a previous cursor position for the newly-selected display region when it was previously selected as a selected display region.

In accordance with certain embodiments the cursor control unit is configured such that following a change to a newly-selected display region from a previously-selected display region an initial display characteristic associated with the cursor is modified in the newly-selected display region as compared to the appearance of the cursor when subsequently moved within the newly-selected display region.

In accordance with certain embodiments the computer system further comprises a further display region, and the cursor control unit is arranged to select one of the first display region, the second display region and the further display region as a selected display region based on the view-direction signaling associated with the vision tracking unit and to control a cursor to move within the selected display region based on the movement signaling associated with the user input unit.

In accordance with certain embodiments the user input unit comprises a hand-operated pointing device.

In accordance with certain embodiments the user input unit comprises a unit selected from the group comprising: a computer mouse, a track-pad, a joystick, a track ball, and a digitizer pad.

In accordance with certain embodiments the vision tracking unit comprises a camera unit and a processing unit configured to process images of a user obtained from the camera unit to determine a direction in which the user is looking.

In accordance with certain embodiments the vision tracking unit comprises a unit selected from the group comprising: an eye tracker and a head tracker.

Certain embodiments of the invention provide a computer-implemented method for controlling the movement of a displayed cursor in a computer system comprising a first display region and a second display region, the method comprising: generating movement signaling by measuring movements made by a user in association with a user input unit; generating view-direction signaling by determining a direction in which a user is looking; selecting one of the first display region and the second display region as a selected display region based on the view-direction signaling; and controlling a displayed cursor to move within the selected display region based on the movement signaling associated with the user input unit.

Embodiments of the present invention will be described hereinafter and in the context of a computer-implemented system, method and computer program product which may be stored on a non-transitory medium. Although some of the present embodiments are described in terms of a computer program product that causes a computer, for example a personal computer or other form of workstation, to provide the functionality associated with some embodiments of the invention, it will be appreciated from the following description that this relates to only one example of some embodiments of the present invention. For example, in some embodiments of the invention, a network of computers, rather than a stand-alone computer, may implement the embodiments of the invention. Alternatively, or in addition, at least some of the functionality of the invention may be implemented by means of special purpose hardware, for example in the form of special purpose integrated circuits (e.g., Application Specific Integrated Circuits (ASICs)).

FIG. 1 is a schematic representation of an exemplary network 1 of computer controlled diagnostic devices, stand-alone computer workstations and associated equipment. The network 1 comprises three components. There is a main hospital component 2, a remote diagnostic device component 4 and a remote single user component 6. The main hospital component 2 comprises a plurality of diagnostic devices for acquiring patient images, in this example, a CT scanner 8, a MR imager 10, a digital radiography (DR) device 12 and a computed radiography (CR) device 14, a plurality of computer workstations 16, a common format file server 18, a file archive 20 and an internet gateway 15. All of these features are inter-connected by a local area network (LAN) 25.

The remote diagnostic device component 4 comprises a CT scanner 11, a common format file server 13 and an internet gateway 17. The CT scanner 11 and file server 13 are commonly connected to the internet gateway 17, which in turn is connected via the internet to the internet gateway 15 within the main hospital component 2.

The remote single user component 6 comprises a computer workstation 21 with an internal modem (not shown). The computer workstation 21 is also connected via the internet to the internet gateway 15 within the main hospital component 2.

The network 1 is configured to transmit data within a standardized common format. For example, the CT scanner 8 initially generates a source data set, i.e. a 3D image data set, from which an operator may derive an appropriate 2D image. The 2D image is encoded in a standard image data format and transferred over the LAN 25 to the file server 18 for storage on the file archive 20. A user working on one of the computer workstations 16 may subsequently request the image, the file server 18 will retrieve it from the archive 20 and pass it to the user via the LAN 25. Similarly, a user working remotely from the main hospital component 2, either within the remote diagnostic device component 4, or the remote single user component 6, may also access and transmit data stored on the archive 20, or elsewhere on the network 1.

Figure 2:
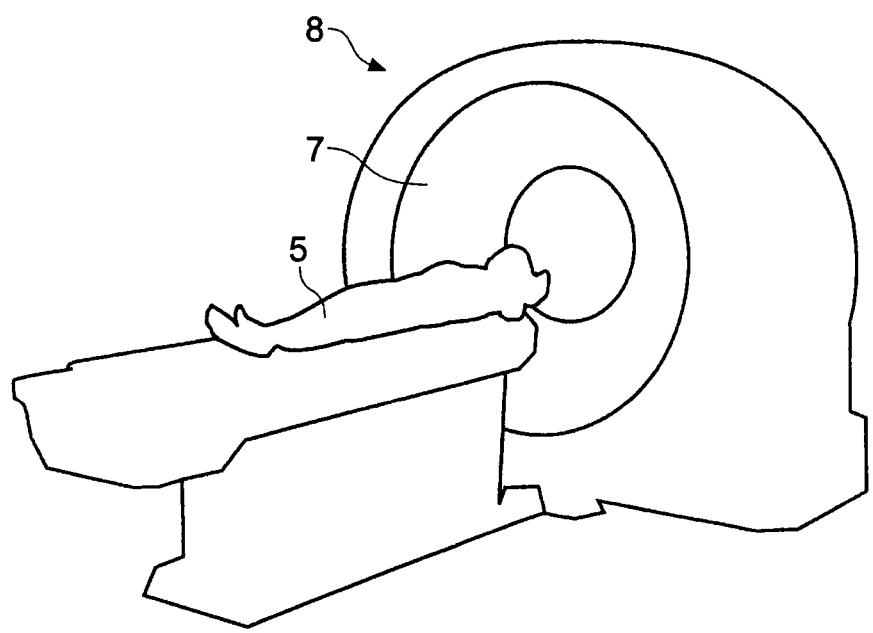
FIG. 2 shows a generic CT scanner for generating volume data.

FIG. 2 is a schematic perspective view of a generic scanner, most especially a computer-assisted tomography (CT) scanner 8 such as represented in FIG. 1, for obtaining cross-sectional images on X-ray attenuation associated with a region of a patient 5 within an opening 7 of the scanner 8.

Different imaging modalities (e.g. CT, MR, PET, ultrasound) may be used to provide different types of medical image data.

Figure 3A:
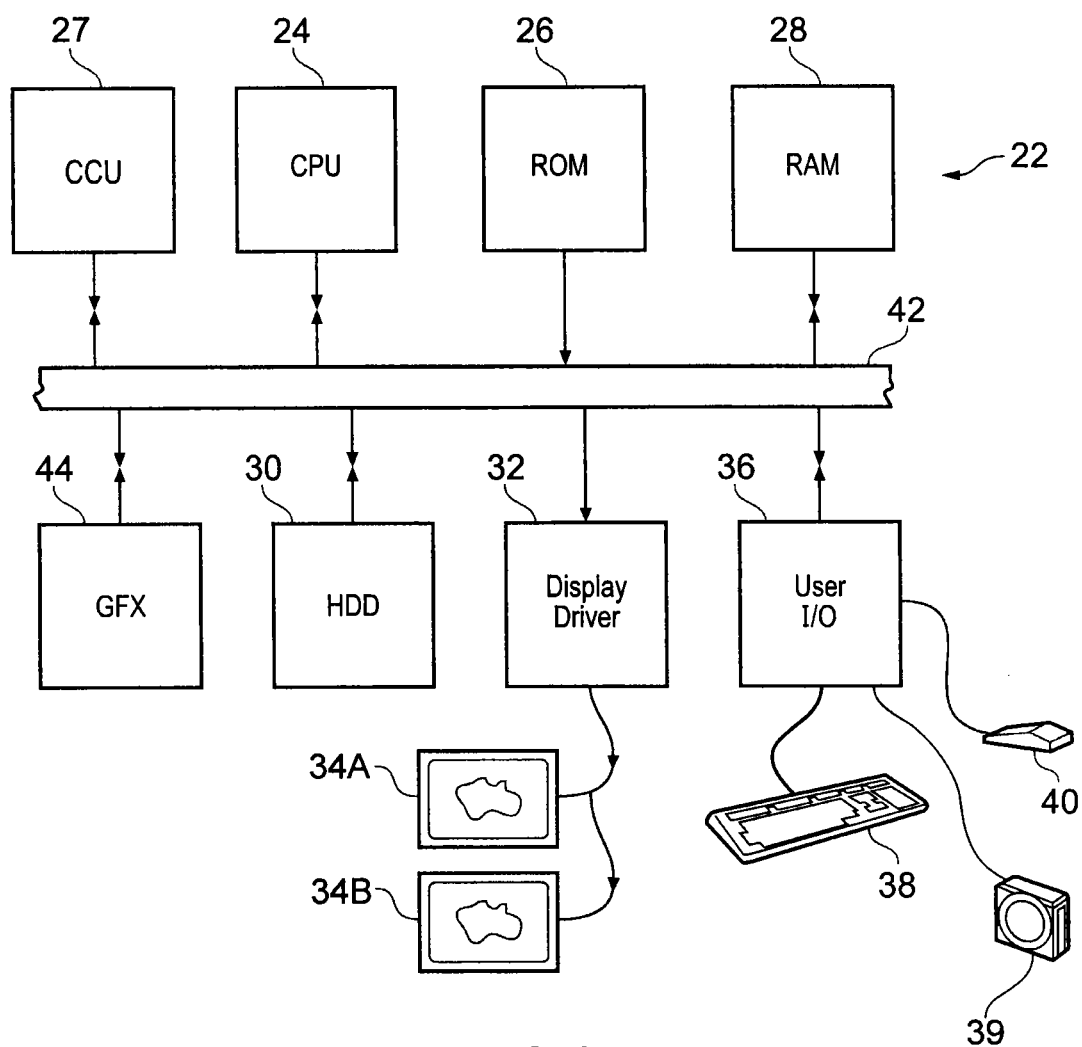
FIGS. 3A and 3B schematically show a computer system for processing image data in accordance with an embodiment of the invention.
Figure 3B:
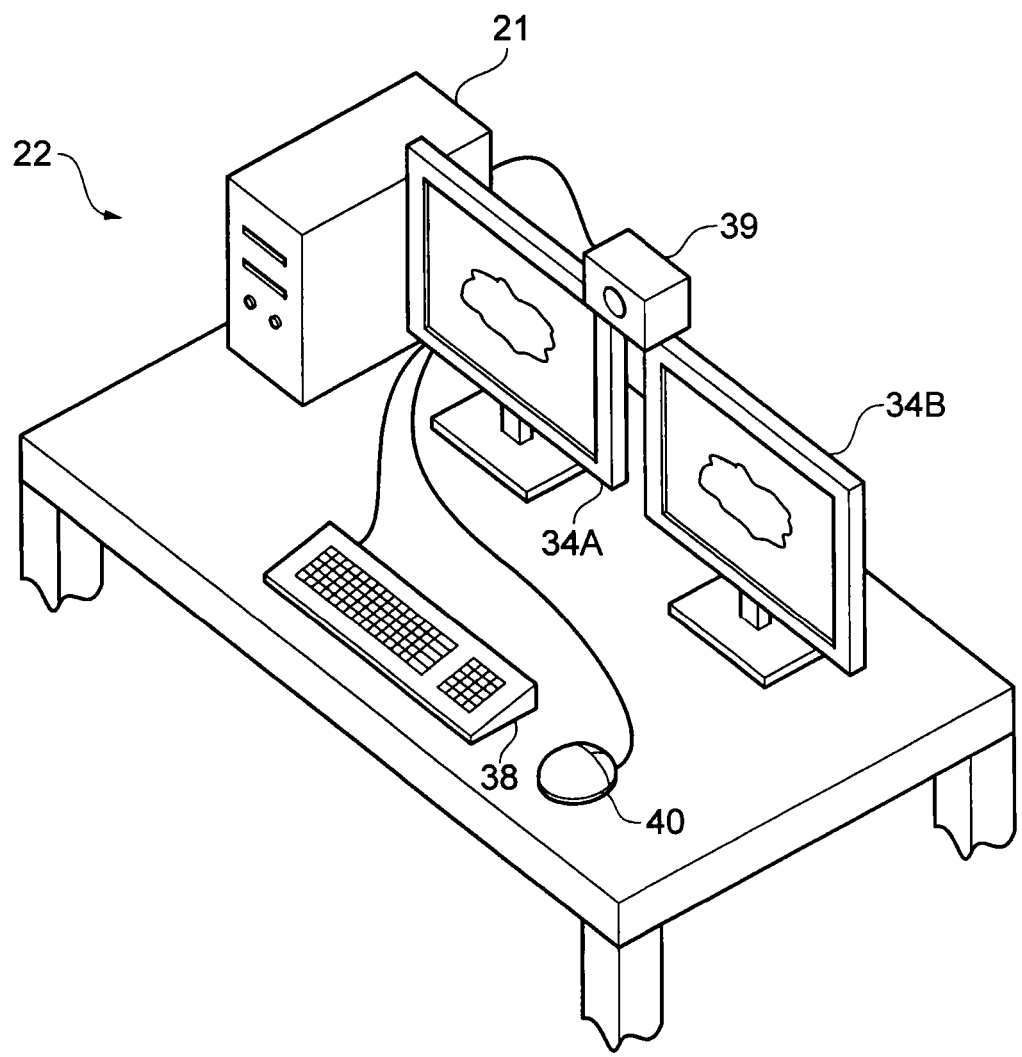

FIGS. 3A and 3B schematically illustrate a general purpose computer system 22 configured to perform processing in accordance with an embodiment of the invention. FIG. 3A primarily represents the functional units comprising the computer system 22 while FIG. 3B is a schematic perspective view showing the computer system 22 arranged for use.

The computer 22 includes a central processing unit (CPU) 24, a read only memory (ROM) 26, a random access memory (RAM) 28, a hard disk drive 30, a display driver 32, a cursor control unit (CCU) 27 and two displays 34, namely a first display 34A and a second display 34B, and a user input/output (IO) circuit 36 coupled to a keyboard 38, vision tracking unit 39 and mouse 40. These devices are connected via a common bus 42. The computer 22 also includes a graphics card 44 connected via the common bus 42. The graphics card includes a graphics processing unit (GPU) and random access memory tightly coupled to the GPU (GPU memory). The cursor control unit 27 is an element of the computer system 22 configured to provide functionality in accordance with embodiments of the invention as discussed further below. The cursor control unit 27 is schematically represented as a discrete element of the computer system 22 in FIG. 3A. However, it will be appreciated that in many cases the operating functionality of the cursor control unit 27 as discussed further below will be provided as a software-implemented function of an operating system of the computer system 22 or of an application program running on the computer system 22, such as a medical imaging software application rather than as a discrete hardware element.

The CPU 24 may execute program instructions stored within the ROM 26, the RAM 28 or the hard disk drive 30 to carry out processing, display and manipulation of medical image data that may be stored within the RAM 28 or the hard disk drive 30. The RAM 28 and hard disk drive 30 are collectively referred to as the system memory. The CPU 24 may also execute program instructions corresponding to an operating system of the computer system 22. In this respect, the CPU may be considered to comprise various functional units for performing tasks associated with the operation of the computer system 22. The GPU may also execute program instructions to carry out processing image data passed to it from the CPU.

Various functional elements comprising the computer system 22, such as the CPU 24, ROM 26, RAM 28, cursor control unit 27, hard disk 30, display driver 32, user input/output (IO) circuit 36, graphics card 44 and connection bus 42 are contained in an enclosure 21. The two displays 34A, 34B, keyboard 38, vision tracking unit 39 and mouse 40 are in this case separate from the enclosure with appropriate wiring connecting them back to the relevant functional elements of the computer system in the enclosure 21. In this respect the computer system 22 of the example embodiment in FIGS. 3A and 3B may be considered as being of a desktop type, although other types of computer system could equally be employed.

It will be appreciated the various elements of FIGS. 3A and 3B are shown schematically. For example, while the vision tracking unit 39 is represented in FIG. 3B as a distinct unit positioned in the vicinity of the displays 34, in practice the vision tracking unit may comprise different components, such as a camera component and a processing component, and these components may be physically and functionally separate within the computer system. In particular, the camera component may be located above the displays 34 as schematically shown in FIG. 3B, while the functionality of the processing component of the vision tracking unit 39 may be provided through appropriate configuration/programming within the user I/O circuit 36 and/or CPU 24, for example, in accordance with established user interface techniques in computer systems. It will further be appreciated the vision tracking unit may be incorporated within other aspects of the computer system. For example, the vision tracking unit in some examples may comprise a camera component integrated into one or other, or both, displays.

Figure 4:
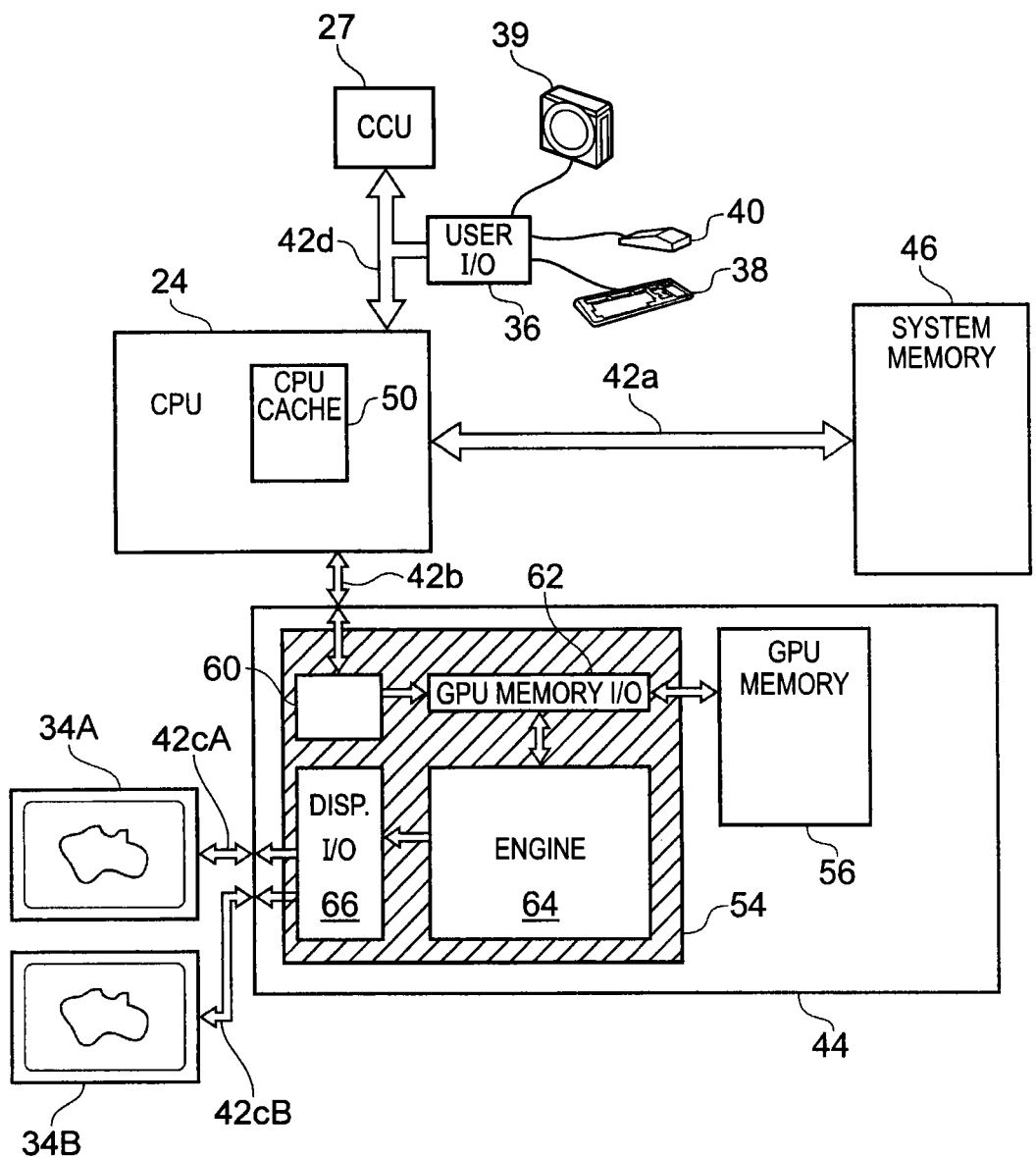
FIG. 4 schematically shows some of the features of the computer system of FIG. 3 in more detail.

FIG. 4 schematically shows some of the features of the computer system 2 shown in FIGS. 3A and 3B in more detail. The RAM 28 and hard disk drive 30 are shown collectively as a system memory 46. Medical image data obtained from the scanner 8 shown in FIG. 2 is stored in the system memory as shown schematically in the figure. To assist in showing the different data transfer routes between features of the computer system 22, the common bus 42 shown in FIG. 3 is schematically shown in FIG. 4 as a series of separate bus connections 42a-d. One bus connection 42a connects between the system memory 46 and the CPU 24. Another bus connection 42b connects between the CPU 24 and the graphics card 44. A further pair of bus connections, namely a first bus connection 42cA and a second bus connection 42cB, connects between the graphics card 44 and respective ones of the displays 34A, 34B. Another bus connection 42d connects between the user I/O circuit 36, cursor control unit 27 and the CPU 24. The CPU includes a CPU cache 50. The graphics card 44 includes a GPU 54 and a GPU memory 56. The GPU 54 includes circuitry for providing an accelerated graphics processing interface 60, a GPU cache I/O controller 62, a processing engine 64 and a display I/O controller 66. The processing engine 64 is designed for optimized execution of the types of program instructions typically associated with processing medical image data sets.

A user is able to select desired processing parameters using the keyboard 38 and mouse 40 (or other pointing device, such as a track pad or pen tablet/digitizer) in combination with a graphical user interface (GUI) displayed on the display 34, for example using a movable screen cursor in combination with the mouse, track pad etc. to point and click within respective ones of the first and second displays 34A, 34B as discussed further below.

Methods described herein can be used within a hospital environment. In this case, the methods may usefully be integrated into a stand-alone software application, or with a Picture Archiving and Communication System (PACS). A PACS is a hospital-based computerized network which can store data representing diagnostic images of different types in a digital format organized in a single central archive. For example, images may be stored in the DICOM format. The archive is connected to a computer network provided with a number of workstations, so that users all around the hospital site can access and process patient data as needed. Additionally, users remote from the site may be permitted to access the archive over the Internet.

A user such as a radiologist, a consultant, or a researcher can access any medial image data set from the workstation, and generate display images on respective ones of the displays 34A, 34B, such as a still image of a 2D or 3D data set or moving images from a 4D data set in accordance with conventional techniques, for example following the established principles associated with displaying medical image data of interest on multiple display screens.

In accordance with some embodiments of the invention, a computer implementation employing computer program code for storage on a data carrier or in memory can be used to control the operation of the CPU and GPU of the computer system in conjunction with inputs received through the user I/O 36 from the input devices such as the keyboard 38, pointing device 40, and vision tracking unit 39. The computer program can be supplied on a suitable carrier medium, for example a storage medium such as solid state memory, magnetic, optical or magneto-optical disk or tape based media. Alternatively, it can be supplied on a transmission medium, for example a medium with a carrier such as a telephone, radio or optical channel.

As noted above, the computer system represented in FIGS. 3A, 3B and 4 in accordance with an embodiment of the invention includes a vision tracking unit 39. The vision tracking unit 39 is configured to determine in which direction a user of the computer system 22 is looking. In particular, the vision tracking unit 39 in accordance with embodiments of the invention is configured to make a determination as to whether a user is deemed to be looking at the first display 34A or the second display 34B. The vision tracking unit 39 may be based on conventional techniques, for example eye- or head-tracking techniques which involve processing video images of the user obtained with a camera component of the vision tracking unit 39. For example, the vision tracking unit may be based around the Kinect input device available from Microsoft. However, it will be appreciated the choice of vision tracking technology employed in accordance with different example implementations is not significant to the underlying principles of operation in accordance with embodiments of the invention. Thus, the vision tracking unit is configured to provide an indication of a view direction for a user, which may be converted to an indication as to whether a user is looking at the first display 34A, or the second display 34B. This can be readily established based on the location of a camera component of the vision tracking unit and the respective display screens. For example, referring to the arrangement in FIG. 3B, if the vision tracking unit 39 determines that a user is looking downwards and to the left of the camera component of the vision tracking unit 39, it may be determined that the user is looking at the first display 34A. Conversely, if the vision tracking unit 39 determines that a user is looking downwards and to the right of the camera component of the vision tracking unit 39, it may be determined that the user is looking at the second display 34B. Thus, in accordance with embodiments of the invention, the vision tracking unit is configured to determine which of a plurality of displays is currently being looked at by a user, and furthermore, to generate corresponding view-direction signaling indicative thereof. A display that is currently being looked at by a user according to the view-direction signaling may conveniently be referred to as a currently-selected display.

As discussed further below, the view-direction signaling provided by the vision tracking unit 39 may be used to control a cursor on the displays 34A, 34B in association with movement signaling generated in correspondence with user movements associated with the mouse 40. The mouse 40 may operate in accordance with conventional techniques for generating movement signaling in association with a user input device of this kind.

As an example use of cursor control in a multi-display computer system in the medical imaging field, a clinician/radiologist may wish to compare the diameter of an abdominal aortic aneurysm (AAA) before and after an endovascular aneurysm repair (EVAR) procedure. This may involve presenting on a first display a pre-repair image of the AAA and presenting on a second display a post-repair image of the AAA. It will, however, be appreciated the specific medical condition being considered and the specific type of medical image data being viewed are not significant to the underlying principles of operation in accordance with embodiments of the invention.

For the sake of comparison, FIGS. 5A to 5E schematically represent how a user may control a cursor to compare the pre- and post-repair diameters of a AAA in accordance with conventional techniques. Each of FIGS. 5A to 5D represents a first display screen 54A and a second display screen 54B of a conventional two-screen computer system at various stages of user operation. Throughout the stages of operation represented in FIGS. 5A to 5D the first display screen 54A is displaying a pre-repair image of an AAA 55A and the second display screen 54B is displaying a post-repair image of the AAA 55B. In each representation of the AAA in FIGS. 5A to 5D a dashed line is included to schematically show the distance the user wishes to measure (i.e. what the user has identified as the relevant diameter for the AAA in accordance with the user's clinical judgment).

Figure 5A:
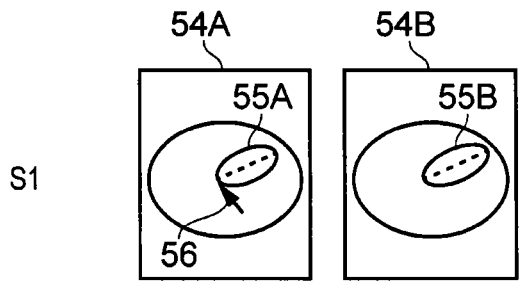
FIGS. 5A to 5E schematically represent how a user may control a cursor to take measurements from medical image data represented on two displays in accordance with conventional techniques.

In accordance with conventional techniques, a user will manipulate a mouse to move a corresponding cursor on the first display screen 54A to a first location 56 on one side of the AAA which the user wishes to measure. Once the cursor is located according to the user's wishes, the user may record the selected location, for example by "clicking" a button associated with the mouse in accordance with conventional medical image processing software techniques. This first step S1 is schematically represented in FIG. 5A.

Figure 5B:
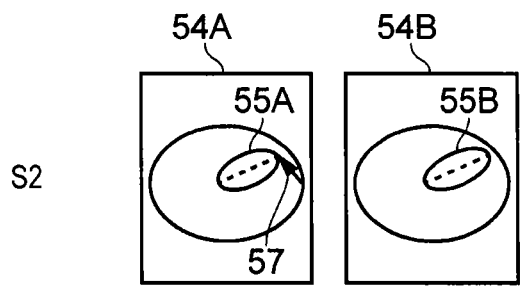

In a second step S2 schematically represented in FIG. 5B the user manipulates the cursor on the first display screen 54A using the associated mouse to a second location 57 on an opposing side of the pre-repair AAA image. Once the cursor is located according to the user's wishes, the user may again record the selected location by "clicking" a button associated with the mouse.

Once the user has identified two points on opposing sides of the pre-repair AAA in this way an estimate of the diameter of the pre-repair AAA can be made in accordance with conventional techniques associated with medical imaging visualization software. For example, an estimate of the diameter of the AAA can readily be established based on the distance between the display pixels corresponding to the selected locations on opposing sides of the AAA in steps S1 and S2 and by taking account of the scaling of the displayed medical image data.

In order to make a corresponding measurement for the post-repair MA image, the user undertakes similar steps to those discussed above in relation to FIGS. 5A and 5B in relation to the post-repair image data on the second display screen 54B.

Figure 5C:
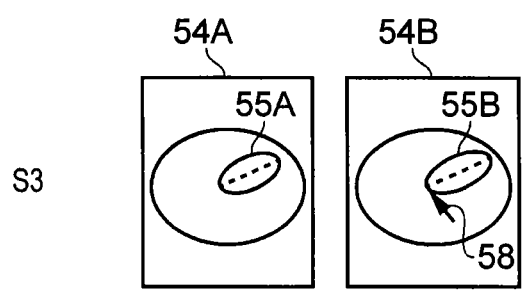

Thus, in a third step S3 schematically represented in FIG. 5C, the user manipulates the mouse so the cursor moves from the first display screen 54A to the second display screen 54B. As noted above, this is conventionally done by making a large sweeping movement with the mouse to cause the cursor to switch screens. The user may then further manipulate the cursor to a third location 58 on a first side of the post-repair AAA image 55B. Once the cursor is located according to the user's wishes, the user may again click a mouse button to indicate the location has been selected.

Figure 5D:
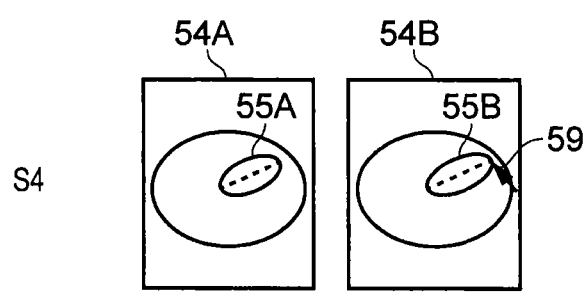

Finally, in a fourth step schematically represented in FIG. 5D, the user manipulates the cursor on the second display screen 54B using the mouse to a fourth location 59 on an opposing side of the post-repair AAA image. This location is again recorded by clicking a mouse button.

Once the user has identified the two points on opposing sides of the post-repair AAA image represented on the second display screen 54B, an estimate of the diameter of the post-repair AAA can be made in accordance with conventional techniques associated with medical imaging visualization software.

Figure 5E:
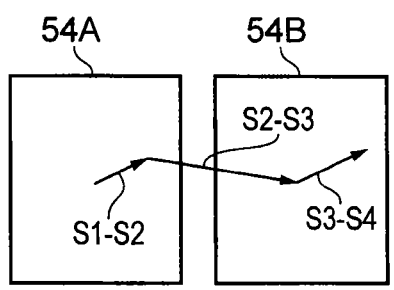

FIG. 5E schematically represents the movements required of the cursor, and hence also represents corresponding movements required of the mouse, to undertake the measurements discussed above with reference to FIGS. 5A to 5D. Thus, FIG. 5E schematically shows the first and second display screen 54A and 54B with arrow indications showing the path taken by moving the cursor in accordance with the steps S1 to S4 represented in FIG. 5A to 5D (or at least the straight-line equivalents of the sections making up this path). Each section of the path in FIG. 5E is labeled by the pairs of steps (as represented in FIGS. 5A to 5D) which correspond with the beginning and end points of the respective path sections.

Thus, a first path section labeled S1-S2 in FIG. 5E corresponds with the cursor movement across the pre-repair AAA, a second path section labeled S2-S3 corresponds with the cursor movement from the first display screen 54A to the second display screen 54B, and a third party section labeled S3-S4 corresponds with the cursor movement across the post-repair AAA.

Having described cursor movements required in accordance with a conventional technique for undertaking this specific example task in a computer system comprising two display screens, an approach for undertaking corresponding measurements in accordance with an embodiment of the invention using the computer system 22 of FIGS. 3A, 3B and 4 will now be described with reference to FIGS. 6A to 6F and FIG. 7. In this example it will be assumed the computer system is running medical imaging visualization software which is appropriately configured to allow a user to undertake the desired measurements in accordance with conventional medical image processing techniques. As described herein, a significant aspect of approaches in accordance with some embodiments of the invention is that control of a cursor displayed on the displays 34A, 34B is governed both by movement signaling associated with manipulation of the mouse 40 (or other pointing device according to the implementation at hand) and view-direction signaling associated with the vision tracking unit 39.

More specifically, in accordance with certain embodiments of the invention, the cursor control unit 27 of the computer system is configured to select one or other of the displays 34A, 34B as a currently selected display if the vision tracking unit 39 provides signaling indicating the user is looking at that display. A cursor on the selected display is then controlled to move based on movements associated with the mouse 40 in accordance with the established principles for using a mouse to control a cursor on a display. However, if a user's view direction changes and the vision tracking unit determines the user is now looking at the other display, the cursor control unit 27 is configured to select the other of the displays 34A, 34B as the newly-selected display, and to start moving a cursor on the newly-selected display based on corresponding movements associated with the mouse. In this respect, the selected display (i.e. the one the user is determined to be looking towards at a given time) may be considered as an active display within which cursor movements are to be made based on movements associated with a user input pointing device (e.g. mouse).

This approach based on controlling a cursor in a computer system comprising multiple display regions by taking account of both movement signaling associated with a pointing device and view-direction signaling associated with a vision tracking unit can thus provide a user with relatively fine-control over cursor movements within one of the display regions by manipulating a pointing device in the usual manner, while also allowing the user to rapidly move control of the cursor between different displays by simply changing the direction in which he is looking. Thus embodiments of the invention allow a user to manipulate a pointing device to control a displayed cursor in different display screens by simply looking at the display screen in which he wants the cursor movements to be applied.

Thus FIGS. 6A to 6F schematically represent how a user may control a cursor to compare pre- and post-repair diameters of a AAA in accordance with an embodiment of the invention using the computer system 22 of FIGS. 3A, 3B and 4. As with the conventional approach described above with reference to FIGS. 5A to 5E it is assumed a clinician/radiologist wishes to compare the diameter of the AAA before and after an EVAR procedure and this involves presenting on the first display 34A a pre-repair image of the AAA 55A and presenting on a second display 34B a post-repair image of the AAA 55B. In each representation of the AAA in FIGS. 6A to 6E a dashed line is included to schematically show the distance the user wishes to measure (i.e. what the user has identified as the relevant diameter for the AAA in accordance with the user's clinical judgment). As already noted above, it will be appreciated the specific medical condition being considered and the specific type of medical image data being viewed and analysis performed are not significant to the underlying principles of cursor control in accordance with embodiments of the invention.

Each of FIGS. 6A to 6E represents the first display 34A to the left and the second display 34B to the right at various stages of user operation. Throughout the stages of operation represented in FIGS. 6A to 6E the first display 34A is displaying a pre-repair image of the AAA 55A and the second display 34B is displaying a post-repair image of the AAA 55B. It is assumed that throughout the steps represented in FIGS. 6A to 6E the user is looking at one or other of the display screens 34A, 34B and corresponding view-direction signaling is provided by the vision tracking unit 39 as described above. As discussed further below, in steps T1 and T2 represented in FIGS. 6A and 6B the user is concerned with, and hence is looking towards, what is displayed on the first display 34A. Accordingly for these steps the view-direction signaling associated with the vision tracking unit 39 indicates the user is looking at the first display 34A. However, and again as discussed further below, in steps T3, T4 and T5 represented in FIGS. 6C to 6E, the user is concerned with, and hence is looking towards, what is displayed on the second display 34B. Thus for these steps the view-direction signaling indicates the user is looking at the second display 34B. In each of FIGS. 6A to 6E the display which the view-direction signaling indicates is currently being looked at by the user is indicated by a bold outline, whilst the other display which the user is determined/deemed not to be currently looking towards is shown with shading.

In a first step T1 schematically represented in FIG. 6A the user begins measuring the diameter of the AAA in the pre-repair image on display 34A. Accordingly, the user is concerned with, and is looking at, display 34A. In accordance with embodiments of the invention as summarized above, the cursor control unit 27 of the computer system 22 is configured to control movement of a cursor on one or other display of the computer system 22 in association with corresponding movements of the mouse 40 according to which display the user is deemed to be looking at as determined from the view-direction signaling from the vision tracking device 39.

Thus, in step T1 the user is looking at the first display 34A and the cursor control unit 27 receives view-direction signaling from the vision tracking device 39 to indicate this.

Accordingly, the cursor control unit 27 is configured to control movement of a cursor on the first display 34A (because this is the one the user is looking at) in response to movements associated with the mouse 40. Accordingly, the user looking at the first display 34A may manipulate a mouse to move a corresponding cursor on the first display 34A to a first location 36 on one side of the AAA which the user wishes to measure. Once the cursor is located according to the user's wishes, the user may record the selected location, for example by "clicking" a button associated with the mouse, in accordance with conventional medical image processing software techniques.

In a second step T2 schematically represented in FIG. 6B, the user continues looking at the first display 34A as he now wishes to move the cursor to the other side of the AAA to complete the diameter measurement of the pre-repair AAA. Thus the cursor control unit 27 continues to receive view-direction signaling from the vision tracking device 39 to indicate the user is looking at the first display 34A. Accordingly, the cursor control unit 27 is configured to continue controlling movement of the cursor on the first display 34A in response to user movements associated with the mouse 40. Thus, in the second step T2 the user manipulates the cursor on the first display 34A using the associated mouse to a second location 37 on an opposing side of the pre-repair AAA image. Once the cursor is located according to the user's wishes, the user may again record the selected location by "clicking" a button associated with the mouse.

Once the user has identified two points on opposing sides of the pre-repair AAA in this way an estimate of the diameter of the pre-repair AAA can be made in accordance with conventional techniques associated with medical imaging visualization software at hand. For example, an estimate of the diameter of the AAA can readily be established based on the distance between the display pixels corresponding to the selected locations identifying opposing sides of the AAA in step T1 and T2 and by taking account of the display scaling for the medical image data.

In order to make a corresponding measurement for the post-repair AAA image, the user proceeds to undertake similar steps in relation to the post-repair image data presented on the second display 34B. Accordingly, the user's attention switches to the second display 34B displaying the post-repair AAA image with a corresponding change in his view direction whereby the user changes from looking towards the first display 34A to looking towards the second display 34B. As a consequence, the view-direction signaling received by the cursor control unit 27 from the vision tracking unit 39 changes to indicate the user is now looking towards the second display 34B.

The cursor control unit 24 responds to the change in the display towards which the user is looking based on the view-direction signaling received from the vision tracking unit by switching from controlling a cursor on the first display 34A in response to movements associated with the mouse 40 (as in steps T1 and T2 when the user was looking at the first display) to instead controlling a cursor displayed on the second display in response to mouse movements. In this particular example embodiment, when the cursor control unit switches from controlling a cursor on the first display 34A to controlling a cursor on the second display 34B in response to a change in the user's view-direction, it is configured to stop displaying the cursor on the first display screen and to start displaying a cursor on the second display screen with an initial location determined according to a final location for the cursor on the first display screen. This is schematically shown in FIG. 6C.

Thus FIG. 6C represents a third step T3 of the processing in which the user's gaze direction has changed from looking towards the first display to the second display, and the cursor previously displayed on the first display at the second location 37 has been removed from the first display, and a cursor is now displayed instead on the second display at a third location 38. In this embodiment, the initial location 38 for the cursor when first displayed on the newly-active display (i.e. on the second display 34B in this example) is based on a final location for the cursor from when it was displayed on the previously-active display (i.e. on the first display 34A in this example) before the change in which display the user is looking at. In particular, the initial location 38 for the cursor relative to the second display in this example implementation is at the same location (for example in terms of Cartesian coordinates representing the display) as the final location 37 for the cursor relative to the first display.

Thus, in accordance with this embodiment of the invention, a user is able to in effect move the cursor from the first display to the second display simply by changing from looking at the first display to looking at the second display. This is different from the conventional approach presented in FIGS. 5A to 5E in which the user moves a mouse to cause the cursor to move from a final location of interest in the first display 55A to an initial location of interest in the second display 55B.

In accordance with some embodiments of the invention, when a cursor is first displayed at an initial position on a newly-selected display it may be displayed in a highlighted manner as compared to the cursor's normal appearance when being moved in the respective display. This is to help a user more quickly identify the initial location for the cursor on the newly-selected display. The highlighting may evolve, for example, displaying the mouse larger than normal, with a different color, in a flashing manner, or with another visual graphic indicator displayed in the vicinity of the initial location to help catch a user's attention. That is to say, the computer system may be configured such that following a change to a newly-selected display region from a previously-selected display region, an initial display characteristic associated with the cursor may be modified in the newly-selected display region as compared to the appearance of the cursor when it is subsequently moved within the newly-selected display region.

In a fourth step T4 schematically represented in FIG. 6D, the user continues looking at the second display 34B as he wishes to move the cursor to a desired first measurement point on one side of the post-repair AAA. The cursor control unit 27 continues to receive view-direction signaling from the vision tracking device 39 to indicate the user is looking at the second display 34B and accordingly controls movement of the cursor on the second display 34B in response to user movements associated with the mouse 40. Thus, in the fourth step T4 the user manipulates the cursor on the second display 34B using the associated mouse to move the cursor from its initial location 38 to a fourth location 39 on a side of the post-repair AAA image corresponding to a desired first position for the measurement according to the user's clinical judgment. Once the cursor is located according to the user's wishes, the user may record the selected location in the usual manner, for example by again "clicking" a button associated with the mouse.

Finally, in a fifth step T5 schematically represented in FIG. 6E, the user manipulates the cursor within the second display 34B using the mouse to a fifth location 40 on an opposing side of the post-repair AAA image. This location is again recorded by clicking a mouse button. Because the user naturally continues to look at the second display 34B whilst positioning the cursor in this step, the cursor control unit continues to receive view-direction signaling from the vision tracking device which indicates the second screen 34B should remain as the active screen so far as the cursor control is concerned, and hence the cursor is moved response to movements of the mouse in the manner expected by the user.

Once the user has identified the two points on opposing sides of the post-repair AAA image represented on the second display 34B, an estimate of the diameter of the post-repair AAA can be made in accordance with conventional techniques associated with medical imaging visualization software.

FIG. 6F schematically represents the movements of the cursor, and hence also represents corresponding movements of the mouse, to undertake the measurements discussed above in accordance with an embodiment of the invention and with reference to FIGS. 6A to 6E. Thus, FIG. 6F schematically shows the first and second displays 34A, 34B with arrow indications showing the path along which the cursor is moved in response to user manipulation of the mouse. Each section of the path in FIG. 6F is labeled by the pairs of steps (as represented in FIGS. 6A to 6E) which correspond with the beginning and end points of the various path sections.

Thus, a first path section labeled T1-T2 in FIG. 6F corresponds with the cursor movement across the pre-repair AAA. A second path labeled T3-T4 corresponds with the cursor movement from its initial location 38 on the second display 34B as indicated in FIG. 6C to the first measurement location 39 for the post-repair AAA in FIG. 6D. A third path section labeled T4-T5 corresponds with the cursor movement across the post-repair AAA.

A comparison of FIG. 6F representing mouse movements for undertaking the above-described example clinical task in a computer system according to an embodiment of the invention with corresponding mouse movements for undertaking the same task in a conventional computer system as represented in FIG. 5E shows how a reduced amount of mouse movement is be needed to perform the same task in accordance with embodiments of the invention, thereby helping to address some of the drawbacks described above with reference to conventional cursor control schemes.

Figure 7:
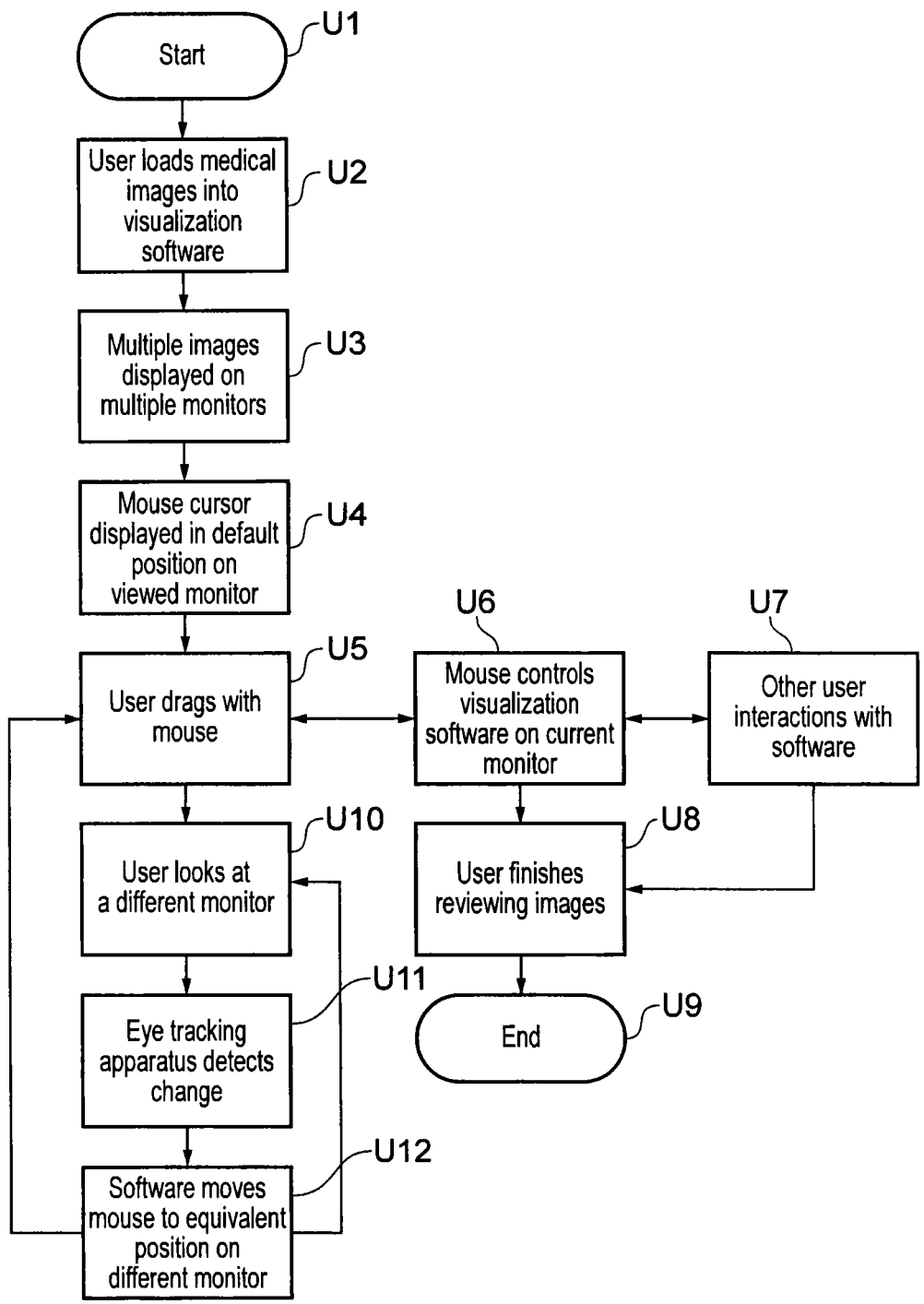
FIG. 7 is a flow diagram schematically representing a method of controlling a cursor when reviewing medical image data in a computer system comprising multiple displays in accordance with an embodiment of the invention.

FIG. 7 is a flow diagram schematically representing a method of reviewing medical image data in a computer system comprising multiple displays (monitors/screens), and in particular the process of controlling a cursor when reviewing the medical image data, in accordance with an embodiment of the invention. In accordance with the principles described herein the computer system in this embodiment comprises a vision tracking unit operable to provide view-direction signaling to a cursor control unit to indicate which of the multiple monitors is being looked towards by a user.

Processing starts in a first step U1.

In a second step U2 a user of the computer system comprising multiple displays loads medical image data of interest into a medical image visualization software application running on the computer system. Again it will be appreciated the specific nature of the medical image data and the corresponding clinical aspects of the medical imaging visualization software application are not significant to the principles underlying embodiments of the invention.

In a third step U3 the user operates the medical visualization software application in accordance with conventional techniques to display multiple images of interest on respective ones of the multiple displays.

In a fourth step U4 the cursor control unit of the computer system operates to display a cursor in an initial default position on whichever monitor is determined as being the monitor currently being looked at by the user according to the view-direction signaling received from the vision tracking unit. The initial default position for the cursor in the currently-viewed display may be arbitrary, for example the initial default position may be at the center of the display or correspond with a previous cursor position, for example a most-recent cursor position prior to step U4 being reached.

For so long as the user continues to look at the same display, i.e. the currently-viewed display remains the same, the cursor control unit is configured to respond to mouse movements by moving the cursor in a corresponding manner on the currently-viewed display. In this way, the user may interact with and control the visualization software on the currently-viewed display in a broadly conventional manner. This process is schematically represented by steps U5, U6 and U7.

Steps U5, U6 and U7 schematically represent steps in which a user manipulates ("drags") a mouse to move the displayed cursor within the currently-viewed display to control the visualization software (step U6) and undertake other interactions with software on the computer system (step U7). These steps may be undertaken in accordance with conventional techniques according to the implementation at hand, for example taking account of the specific operational aspects of the medical visualization software application and what the user wishes to use it for.

In accordance with the processing of FIG. 7, it is assumed that after some time reviewing, and potentially interacting with, what is displayed on the currently-viewed display the user wishes to focus on what is displayed on another one of the multiple displays comprising the computer system. This is schematically represented in step U10 in which a user looks at a different monitor.

In step U11 the vision tracking device (e.g. eye tracking apparatus) detects the change in the users gaze-direction and generate a corresponding change in the view-direction signaling provided to the cursor control unit.

In step U12 software running on the computer system and providing the functionality of the cursor control unit responds to the changing view-direction signaling and switches the displayed cursor from a position on the previous currently-viewed display to a corresponding position on the new currently-viewed display. Processing then returns to step U5 where, for so long as the user continues to look at the newly-selected currently-viewed display, the cursor control unit is configured to respond to mouse movements by moving the cursor in a corresponding manner on the new currently-viewed display. In this way, the user may interact with and control the visualization software on the new currently-viewed display. This process is again schematically represented by steps U5, U6 and U7.

This process may repeat with the user switching between displays by simply looking at which display is currently of interest. As discussed above, the cursor control unit of the computer system is configured to respond to changes in the display of interest (based on changes in corresponding view-direction signaling from a vision tracking unit) to switch control of the cursor in response to mouse movements to the new display of interest.

Eventually a user may finish the task they wish to perform by reviewing the various images on the various displays (step S8) and the processing represented in FIG. 7 may consequently terminate in step U9.

Thus, FIGS. 6A to 6F and 7 have described certain embodiments of the invention which in some respects may be characterized as a method of controlling a computer cursor comprising displaying a computer cursor on one of at least two video displays; allowing a user to control the cursor with a pointing device operated by hand or other means; tracking the gaze of the user; and moving the cursor to the video display in the user's current gaze.

In accordance with embodiments of the invention a cursor may be displayed at an initial position on a newly-selected display (i.e. a display which a user has just started looking at) at a position which corresponds with a previous position for the cursor displayed on the previously-selected display (i.e. the display which a user was looking at before switching to look at the newly-selected display).

As described above, the correspondence between an initial cursor position in a newly-selected (i.e. newly-viewed) display and a previous cursor position in a previously-selected (i.e. previously-viewed) display may be such that the initial cursor position and the previous cursor position are at corresponding coordinates in the respective displays' coordinate systems.

In accordance with other embodiments of the invention, the computer system may be configured such that the cursor control unit receives information from the software application associated with the data being displayed and selects an initial cursor position in a newly-selected display based on such information.

For example, a medical visualization software application may be configured to establish a registration mapping between one or more anatomical feature(s) in different images in different displays. Furthermore, the medical visualization software may be configured to provide the cursor control unit with information regarding the relative locations of the corresponding anatomical feature(s) in the different images in the different displays. The cursor control unit may thus be configured such that the correspondence between an initial cursor position in a newly-selected (i.e. newly-viewed) display and a previous cursor position in a previously-selected (i.e. previously-viewed) display may be such that the initial cursor position and the previous cursor position are at corresponding locations relative to one or more of the corresponding anatomical features in the respective images represented in the newly-selected and previously-selected displays.

In a similar manner, it is known for medical imaging applications to associate pre-defined measurement points or annotation points on a first image (for example a prior study image) and to establish corresponding locations for these points in a second image of interest by registration mapping. In accordance with some embodiments of the invention, the medical visualization software may be configured to provide the cursor control unit with information regarding the relative locations of the corresponding measurement/annotation points in the different images in the different displays. The cursor control unit may thus be configured such that the correspondence between an initial cursor position in a newly-selected (i.e. newly-viewed) display and a previous cursor position in a previously-selected (i.e. previously-viewed) display may be such that the initial cursor position and the previous cursor position are at corresponding locations relative to one or more of the corresponding measurement/annotation points in the respective images represented in the newly-selected and previously-selected displays.

In another example implementation a user may interact with a medical visualization application to view medical image data on a first display, and may, for example, move a cursor to overlay a specific element of pathology of interest (for example, a tumor, polyp, stent, or other feature of interest). The medical visualization application running on the computer system may be configured to identify that the cursor is associated with the particular pathology element, either through computer aided detection algorithm, or because manual or automatic segmentation has identified the pathology element as such, or the element has otherwise been marked or labeled as a finding of interest by the user. The medical visualization application may further be configured to determine if the relevant pathology element is also present in images represented in the second display region, and if so, to control the cursor control unit to select an initial edition for the cursor in the vicinity of the pathology element as it appears in the second display region when there is a change from the first display region to the second display region following a change in a user's view-direction.

In yet another example implementation a user may interact with a medical visualization application to view medical image data on a first and second (and possibly more) displays. The appearance of the information on the various displays may have corresponding elements (e.g. windows or panes, or displayed icons). For example, each display may comprise a first window for displaying imaging and a second window for displaying control information associated with the displayed imaging in the associated first window. When switching from controlling the cursor in one display to controlling the cursor in another display following a change in a user's view direction, the cursor control units may be configured to select an initial position for the cursor in an area of the newly-selected display corresponding to the area of the previously-selected display in which the cursor was positioned prior to the change.

More generally, a computer system in accordance with an embodiment of the invention may be configured such that an initial cursor position in a newly-selected display region and a cursor position in a previously-selected display region may be at corresponding positions relative to one or more features displayed in both the first and second display regions. The one or more features may, for example, comprise an anatomical area or location, a pathological or other finding, an annotation or measurement, or a user interface element associated with what is displayed in the respective display regions.

Thus various examples of computer systems and methods in accordance with embodiments of the invention have been described. It will however, be appreciated that various aspects of the above-described apparatus and techniques may be modified in accordance with other embodiments of the invention.

For example, in accordance with some embodiments the control of a cursor might not be moved to a new display following a change in a user's view direction in all situations. For example, in some circumstances the cursor might be restricted from moving from one display region to another where doing so might cause distraction for the user. For example because the user is midway through performing a cursor manipulation which is deemed to be one which would not normally be interrupted by a user wishing to switch control to another screen. That is to say, in accordance with some embodiments, a cursor control units may be provided with signaling, for example from a software application running on the computer system which the user is using the cursor to interact with, to indicate whether or not it is permissible to move the cursor to a new display if the user changes view direction.

This may be helpful in some example implementations in accordance with embodiments of the invention in respect of user-interactions that rely on a series of cursor operations (which might be referred to as "cursor steps") within a single display region. In particular, when a user is involved in performing a series of cursor steps it may be appropriate to prevent the cursor control unit from switching the cursor to a different display midway through the series of cursor steps in response to a change in a user's view direction during this time. This can help prevent a momentary change in a user's view direction, for example associated with a sudden distraction in the environment in which the user is working, or a glance towards a clock, from impacting an ongoing task associated with a series of cursor steps.

Examples of tasks which might involve a series of cursor steps include annotation or measurements associated with more than one control or anchor point. For example, to create a length measurement (with two control points) on an image a user may either click on each point for the annotation/measurement, or click-and-drag to identify the desired two points (i.e. a first point where the mouse button is pressed to click and a second point where the mouse button is released after dragging). Another example of tasks which might involve a series of cursor steps include tasks associated with software tools that respond to a drag movement associated with the cursor. Examples of such movements may include using a cursor to scroll through a set of images in a view, change a displayed range of modality values in images in a view (called "windowing" by radiologists), adjust one control point of a measurement/annotation, drag a reference line that shows where one view is positioned in a patient relative to another view, and so forth.

If a cursor were to move to another display while a user is performing such tasks then the user may find such movements to be distracting. To help prevent this the cursor control unit may be configured to receive signaling from a software application operating on the computer system to determine whether the cursor control unit may allow the cursor to move to a different display in response to a change in a user's view direction. The software application operating on the computer system may thus correspondingly be configured to provide the cursor control unit with such information during times when the software application is involved in a task associated with multiple cursor steps.

Thus, in accordance with some embodiments, a computer system may be configured to implement a method broadly corresponding to that represented in FIG. 7, but with an additional decision step between steps corresponding to steps U11 and U12 represented in FIG. 7. In this additional step, once the eye tracking apparatus detects there has been a change in a user's view direction (in a step corresponding to step U11 of FIG. 7), but before the cursor control is moved to a different display (in a step corresponding to step U12 of FIG. 7), the cursor control unit receives signaling from the medical visualization software operating on the computer system to indicate if the cursor may be moved to the new display. The cursor control unit may receive this signaling in response to a specific request, or the signaling may be something which is routinely provided by the medical visualization software, for example on a periodic basis.

If the signaling received from the medical visualization software indicates the user is currently performing a task which has been classified as one which should not be interrupted by a change in view direction, the cursor control unit is configured to ignore the user's changing view direction, and to maintain cursor control in respect of the currently-selected display by in effect returning to a step corresponding to step U5 in FIG. 7 without performing a step corresponding to Figure U12 in FIG. 7.

If, on the other hand, the signaling received from the medical visualization software indicates the user is not currently performing a task which has been classified as one which should not be interrupted by a change view direction, the cursor control unit may proceed to switch from the currently-selected display to a newly-selected display based in response to the user's change in view direction in accordance with the principles described above, for example with reference to step U12 of FIG. 7.

In accordance with these embodiments of the invention, the cursor control unit functionality may be provided as either a component part of the medical imaging application itself, or a component part of an operating system of the computer. If the functionality of the cursor control unit is provided as part of an operating system, then a Software Development Kit (SDK) of the operating system may be provided with an appropriate Application Programming Interface (API) to allow the operating system and cursor control unit to communicate the relevant information between them. In another example a "plug-in" SDK containing the appropriate API may be associated with the medical imaging application.

Another technique for preventing a change in active display in response to a momentary change in a user's view direction when the user does not wish to cause a change in active display might be to require the cursor control unit to receive view-direction signaling indicating the user has viewed another display for at least a minimum amount of time before moving control of the cursor to the newly-viewed display. Thus, momentary changes in a user's view direction will not be responded to, whereas if a user continuously looks at a new display for more than a pre-determined period of time, the cursor control unit will switch control of the cursor to the new display accordingly.

It will further be appreciated that whilst the above-described embodiments have focused primarily on examples in which corresponding medical image data (i.e. pre- and post-procedure images of the same region) are displayed within two display regions, in other examples there may be different relationships between what is being displayed in the two display regions, or indeed no relationship at all. For example, in a medical data context, one display may be used to provide rendered images of a medical imaging data set, while the other display may comprise elements such as text reports, lists of imaging studies, medical data associated with non-imaging modalities (for example graphs or other laboratory results), lists of anatomy or pathology features associated with the medical data for which the images displayed on the other screen, and so forth. More generally, embodiments of the invention may be provided to allow a user to readily switch between controlling a cursor within different ones of multiple display regions by simply looking at the display region of interest.

For example, instead of providing for only a single cursor which is in effect moved between different displays to follow which display a user is looking at, in other examples each display screen may retain its own cursor with the respective cursors being controlled by the mouse, or other pointing device according to whichever screen is currently being looked at. In this case, when a user looks to a previously viewed display, an initial location for the cursor in the display may correspond with the location of the cursor the last time the display was selected as the viewed display.

It will also be appreciated that whilst the above description has primarily focused for simplicity on a computer system comprising two displays, in accordance with other embodiments of the invention a computer system may be provided with more than two displays, and cursor control may be switched among the more than two displays in accordance with the principles described above in the context of two displays.

It will further be appreciated that whilst the above-described embodiments have focused on implementing embodiments of the invention in the context of a computer system comprising multiple display screens, other example embodiments may be implemented in a computer system comprising a single display screen which is considered as being notionally divided into multiple display regions. For example, a single display screen may be considered to comprise a first display region in an area generally towards a left-hand part of the screen and a second display region in an area generally towards a right-hand part of the screen, and this is particularly the case for large landscape medical grade displays, for example, comprising 4, 6 or 10 megapixels. Thus, in a medical imaging context, different medical images of interest may be displayed in the left- and right-hand regions of the single display screen. In accordance with embodiments of the invention a computer system comprising such a display screen comprising multiple display regions may be configured so that movement of a pointing device controls a cursor in whichever region of the display screen a user is currently determined to be looking at. That is to say, embodiments of the invention as described above with reference to a computer system comprising two or more physically distinct display screens may be equally implemented in a computer system comprising a single display screen which is notionally considered as being divided into two or more separate display regions.

It will be appreciated that in principle the control of a cursor in accordance with embodiments of the invention may be provided through use of discrete hardware elements (for example within the user I/O Interface 36 of FIG. 3A) which are configured to provide the appropriate functionality. However, in many cases, and in accordance with conventional techniques for providing user interface functionality, cursor control in accordance with embodiments of the invention may be provided by appropriate configuration of an operating system of the computer program. That is to say, it may sometimes be the case that an operating system of the computer system implementing an embodiment of the invention will be configured to control a displayed cursor by taking account of the movement signaling and view-direction signaling from the associated pointing device and view tracking unit in accordance with the principles described herein. In other cases, it may be a software application associated with what data is being displayed, such as medical visualization application, that is directly responsible for controlling cursor movement, and in such cases the software application may comprise functional software elements for providing the relevant functionality in accordance with embodiments of the invention. In still other cases, it may be a combination of an operating system of the computer system and a software application associated with what data is being displayed, such as a medical imaging application, that are together responsible for providing functionality in accordance with embodiments of the invention to control cursor movement.

It will further be appreciated the measurements of movements associated with a user input device and view directions and the corresponding provision of the movement signaling and view-direction signaling to the cursor control unit, may be made in accordance with conventional techniques associated with such devices. For example, the vision tracking unit may be configured to continuously provide view-direction signaling on a periodic basis or only when there is a measured change in view direction above a predefined threshold according to the implementation at hand.

Embodiments of the invention may include incorporating the methods and associated computer programs described herein as a component in an imaging application, for example in a volume rendering application.

A computer program product bearing machine readable instructions for carrying out the method is disclosed.

A computer loaded with and operable to execute machine readable instructions for carrying out the method is disclosed.

A computer program product is disclosed. Examples of a computer program product bearing machine readable instructions for carrying out the method described above are the mass storage device HDD 30 of FIG. 3, the ROM 26 of FIG. 3, the RAM 28 of FIG. 3 and the system memory 46 of FIG. 4, and the servers 13, 18 of FIG. 1. Other forms of computer program product include a spinning disk based storage device such as a CD or DVD, or a USB flash memory device.

Examples of a computer loaded with and operable to execute machine readable instructions for carrying out the method described above are the computer of FIG. 3, the computer of FIG. 4, and individual elements, e.g. terminals or collective multiple elements of the computer network system shown in FIG. 1, e.g. one of the servers 13, 18 in combination with one or more of the terminals or computers provided with the medical imaging devices.

Examples of a computer program product bearing machine readable instructions for carrying out the method described above are the mass storage device HDD 30 of FIG. 3, the ROM 26 of FIG. 3, the RAM 28 of FIG. 3 and the system memory 46 of FIG. 4, and the servers 13, 18 of FIG. 1. Other forms of computer program product include a spinning disk based storage device such as a CD or DVD, or a USB flash memory device.

While certain embodiments have been described, these embodiments have been presented by way of example only, and are not intended to limit the scope of the inventions. It will be appreciated that features and aspects of the invention described above in relation to certain embodiments of the invention are equally applicable and may be combined with other features and aspects of other embodiments of the invention as appropriate. The novel methods, computers and computer program products and devices described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A computer system for controlling the movement of a displayed cursor, the computer system comprising:
   user input circuitry configured to measure movements made by a user in association with the user input circuitry and to output corresponding movement signaling;
   vision tracking circuitry configured to determine a direction in which a user is looking, and output corresponding view-direction signaling; and
   cursor control circuitry configured to
      select one of a first display region and a second display region as a selected display region based on the view-direction signaling associated with the vision tracking circuitry,
      control a cursor to move within the selected display region based on the movement signaling associated with the user input circuitry, and
      change the display to the first display region from the second display region, or to the second display region from the first display region based on the view-direction signaling,
      wherein the cursor control circuitry is further configured such that following a change to the second display region from the first display region, an initial cursor position in the second display region is determined by taking account of a cursor position in the first display region before the chance, and wherein the initial cursor position in the second display region and the cursor position in the first display region before the change are at corresponding positions relative to one or more features displayed in both the first and second display regions.

2. The computer system according to claim 1, wherein the first and second display regions comprise different display screens.

3. The computer system according to claim 1, wherein the first and second display regions comprise different areas of a single display screen.

4. The computer system according to claim 1, wherein the first and second display regions are configured to display medical image related data.

5. The computer system according to claim 1, wherein the cursor control circuitry is further configured to change the selection of the first or second display regions as the selected display region in response to a change in view-direction signaling indicating the user's view direction has changed from looking at one of the first and second display regions to looking at the other of the first and second display regions.

6. The computer system according to claim 5, wherein the cursor control circuitry is further configured to receive signaling to indicate the cursor control circuitry should avoid changing the selection of the first or second display regions as the selected display region in response to a change in view-direction signaling in respect to a particular change in view-direction signaling.

7. The computer system according to claim 1, wherein the cursor control circuitry is further configured such that following a change to the second a-display region from the first display region an initial cursor position in the second display region is determined by taking account of a previous cursor position for the second display region when it was previously selected as the first display region.

8. The computer system according to claim 1, wherein the cursor control circuitry is further configured such that following a change to the second-display region from the first display region an initial display characteristic associated with the cursor is modified in the second display region as compared to the appearance of the cursor when subsequently moved within the second display region.

9. The computer system according to claim 1, further comprising a further display region, and wherein the cursor control circuitry is further configured to select one of the first display region, the second display region and the further display region as a selected display region based on the view-direction signaling associated with the vision tracking circuitry and to control a cursor to move within the selected display region based on the movement signaling associated with the user input circuitry.

10. The computer system according to claim 1, wherein the user input circuitry comprises a hand-operated pointing device.

11. The computer system according to claim 1, wherein the user input circuitry comprises at least one of computer mouse, a track-pad, a joystick, a track ball, and a digitizer pad.

12. The computer system according to claim 1, wherein the vision tracking circuitry further comprises a camera and a processor configured to process images of a user obtained from the camera to determine a direction in which the user is looking.

13. The computer system according to claim 1, wherein the vision tracking circuitry further comprises at least one of an eye tracker and a head tracker.

14. A computer-implemented method for controlling the movement of a displayed cursor in a computer system comprising a first display region and a second display region, the method comprising:

generating movement signaling by measuring movements made by a user in association with a user input circuitry;

generating view-direction signaling by determining a direction in which a user is looking;

selecting one of the first display region and the second display region as a selected display region based on the view-direction signaling;

controlling a displayed cursor to move within the selected display region based on the movement signaling associated with the user input circuitry;

changing the display to the first display region from the second display region, or to the second display region from the first display region based on the view-direction signaling; and following a change to the second display region from the first display region, determining an initial cursor position in the second display region by taking account of a cursor position in the first display region before the change, wherein the initial cursor position in the second display region and the cursor position in the first display region before the change are at corresponding positions relative to one or more features displayed in both the first and second display regions.

15. A non-transitory computer-readable medium encoded with computer-readable instructions that, when executed by a processor, cause the processor to perform the method of claim 14.

16. An apparatus loaded with and operable to execute machine readable instructions for carrying out the method of claim 14.

* * * * *